United States Patent [19]
Hays

[11] Patent Number: 5,711,483
[45] Date of Patent: Jan. 27, 1998

[54] LIQUID SPRAYING SYSTEM CONTROLLER INCLUDING GOVERNOR FOR REDUCED OVERSHOOT

[75] Inventor: Lyman V. Hays, Westlake Village, Calif.

[73] Assignee: Durotech Co., Moorpark, Calif.

[21] Appl. No.: 590,914

[22] Filed: Jan. 24, 1996

[51] Int. Cl.$^6$ ............................................. B67D 5/08
[52] U.S. Cl. ....................... 239/71; 222/63; 417/15; 417/20
[58] Field of Search ...................... 239/71; 222/63; 417/44.2, 17, 18, 20, 15, 38, 42

[56] References Cited

U.S. PATENT DOCUMENTS

| | | | |
|---|---|---|---|
| 3,044,661 | 4/1962 | Cartwright | 239/71 |
| 3,499,599 | 3/1970 | Meininger et al. | 417/44.2 |
| 3,985,467 | 10/1976 | Lefferson | 417/44.2 |
| 4,917,296 | 4/1990 | Konieczynski | 239/71 |
| 5,197,860 | 3/1993 | Nishida et al. | 417/15 |
| 5,282,722 | 2/1994 | Beatty | 417/44.2 |
| 5,360,320 | 11/1994 | Jameson et al. | 417/44.2 |
| 5,464,283 | 11/1995 | Davis | 239/71 |

OTHER PUBLICATIONS

Paul Horowitz, Winfield Hill, *The Art of Electronics*, Second Edition, Cambridge University Press, New York, 1991, pp. 421–425 and 1001–1002.

*Primary Examiner*—Andres Kashnikow
*Assistant Examiner*—Lisa Ann Douglas
*Attorney, Agent, or Firm*—Koppel & Jacobs

[57] ABSTRACT

A spray controller includes a governor which limits the current applied to an electric motor that operates a spray system pump. The controller accepts pressure sensing and pressure setting signals and provides a pulse train output to drive the motor whenever the sensor signal indicates that the output pressure is less than the "set" pressure. The governor accepts the spray pressure setting signal and limits the width of the pulse train as a function of the desired pressure setting, thus limiting the motor's current and speed. In the preferred embodiment, the motor's speed is restricted at lower pressure settings, but is allowed to operate at maximum speed at higher pressure settings.

15 Claims, 3 Drawing Sheets

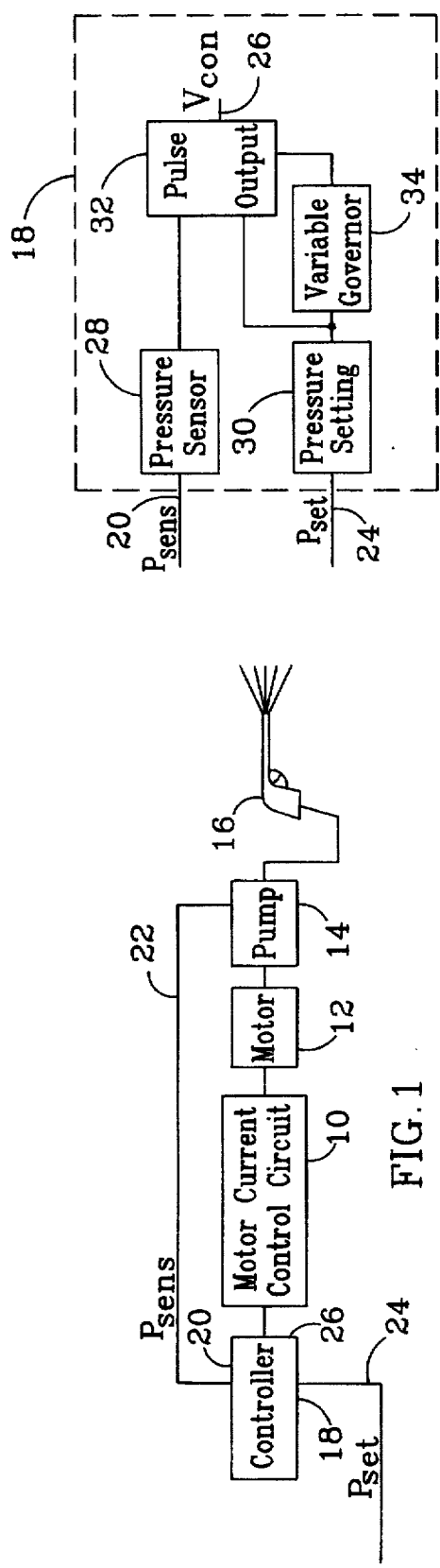
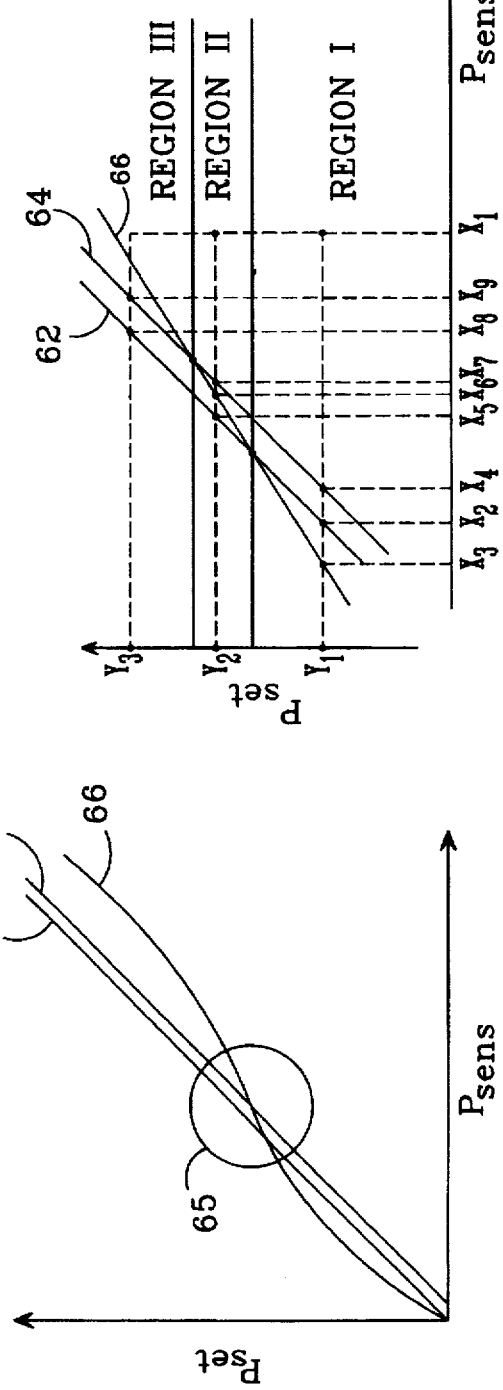

LIQUID SPRAYING SYSTEM CONTROLLER INCLUDING GOVERNOR FOR REDUCED OVERSHOOT

BACKGROUND OF THE INVENTION

1. Field of the Invention

This invention relates to liquid spraying systems and, more particularly, to liquid spraying systems for use as paint sprayers or similar applications.

2. Description of the Related Art

Spraying systems have supplanted older, labor-intensive liquid delivery systems for many applications. The construction industry in particular has seen a significant increase in the use of spraying systems for applying liquid materials to structural surfaces. For example, stucco, drywall "texture" material, insulation/fire retardant materials and paint, which at one time were applied almost exclusively with a trowel, roller, or brush, are now often sprayed onto a target surface. Because painting is probably the most widely-used of these applications, the following discussion will refer to paint spraying, but the problems and solutions apply to all of the above-mentioned applications.

Paint spraying systems typically consist of a reservoir, hoses, pump, pump motor, pump motor controller and "spray gun". The reservoir holds the paint, hoses (or pipes) deliver the paint to the pump and the pump is operated by the motor. Another hose delivers the paint from the pump to the spray gun where a painter controls the flow of paint by operating a trigger on the gun. Typically, the trigger provides "on-off" control of the spray gun, i.e., when depressed, the trigger permits the flow of paint from the hose at a rate which is largely determined by the pressure of the pump and the restriction of the hoses and spray gun aperture (spray tip). When released, the trigger shuts off the flow of paint by closing a valve or "shutter" within the gun.

When operating the paint sprayer, a painter will move along a target surface, e.g., a wall, spraying a portion of the wall with each sweep (horizontal or vertical) of the spray gun. Ideally the pump pressure remains constant as the painter moves along the wall, spraying adjacent sections of the wall with each sweep and applying an even coat of paint to the wall.

However, if the pump pressure does not remain constant the paint can be applied unevenly. Each painted section preferably has a relatively straight border so that the adjacent section may be painted using a relatively straight motion without creating sections of excessive overlap and/or areas devoid of paint. But, if the pump pressure varies while a section is painted, the spray pattern width will also vary, making it difficult to properly overlap adjacent areas of paint. In addition, pressure variations may produce uneven atomization of the paint, resulting in an uneven thickness of the paint coat. These problems can be very noticeable.

Furthermore, it is desirable to avoid over-spray in any case. Painters typically "mask off" an area that is not to be painted. Precise control of the spraying system's pressure would provide more exact control of the system's spray pattern and may eliminate some of the time-consuming masking operation.

Some applications require greater precision than others; painting the trim on a house, for example, requires greater precision and control than painting a 10 meter by 40 meter warehouse wall. When painting the wall with elastomeric or latex paint, a painter may use the highest pressure setting available on the paint sprayer in order to achieve a uniform spray pattern. Conversely, when painting the house trim with stain, the painter would set the sprayer at a much lower setting to provide good atomization. At low pressure, when spraying stain for example, pressure variations have a greater impact upon the sprayer's spray pattern. For these reasons, uniformity of pressure is even more important at low pressure settings than at high pressures.

In a conventional spray system, a painter sets the pump pressure to a desired level by adjusting a control input such as a dial on the spray system. The system's output pressure is sensed using a resistive strain gauge bridge, and the differential voltage from the bridge is fed to a differential amplifier which provides a "single-ended" signal representative of the system's measured output put pressure. This signal is compared with one which represents the desired pressure setting, i.e. the dial setting. The result of this operation is used to control the pump motor, turning the motor off if the pressure is too high, and turning it on if the pressure is too low. During operation, the pump motor tends to oscillate continuously because, although the pump will turn on when pressure drops too far, some time will pass before the output pressure begins to build toward the desired level. That is, the output pressure will "undershoot" the desired value. Similarly, after the desired pressure is reached, the pump will continue to operate for some time, due in part to the pump's mechanical inertia, thus creating pressure "overshoot".

Although turning the pump motor "completely on" in this manner allows the pump to achieve a high output pressure sure in a relatively short period of time, the oscillation of the motor varies the sprayer's dynamic, or operating, pressure proportionately. While this variation may be tolerable at high pressure settings, the same oscillations and the same absolute values of overshoot (and undershoot) will occur at low pressures. That is, when spraying at an output pressure of 20.685 MPa(3000 psi), a 344.756 kPa (50 psi) peak to peak variation in pressure due to motor oscillation may be tolerable. But when operating at an output pressure of only 2,068 MPa(300 psi) the same 344,756 kPa (50 psi) variation could prove disastrous. Although the width of the spray pattern is "off" by the same amount as it is in the high pressure example, this could have more serious consequences in a low-pressure, precision painting application than in a high-pressure application.

For the forgoing reasons there is a need for a liquid spraying system which provides a more uniform fluid pressure, especially at the low pressure range of the spraying system.

SUMMARY OF THE INVENTION

The invention is directed to a liquid spraying system controller that provides substantially uniform dynamic output pressure with improved control at low-level pressures.

A suitable spraying system will include a conventional electric-motor current-control circuit (e.g., an SCR drive circuit), a mechanical pump, an electric motor which drives the pump, and a spray gun which is connected to the pump and through which the liquid is sprayed. The controller provides a motor control signal for use by the current control circuit. The controller includes an interface to a pressure sensor which senses the pump's output pressure and to a pressure setting device by which an operator "dials in" a desired operating pressure. A new "current governor", which limits the current sent to the motor, is included in the controller. The governor adjusts the maximum current as a function of the desired pressure setting. In a preferred embodiment, this function is a nonlinear function which reduces overshoot and undershoot at low pressure settings, yet permits rapid attainment of high pressures at higher pressure settings.

These and other features, aspects and advantages of the invention will be apparent to those skilled in the art from the following detailed description, taken together with the accompanying drawings.

BRIEF DESCRIPTION OF THE DRAWINGS

FIG. 1 is a block diagram of a liquid spraying system which employs the inventive controller.

FIG. 2 is a block diagram of the new controller which illustrates its major components, including the novel current governor.

FIG. 5 is a graph of desired versus measured pressure for a preferred embodiment of a liquid spraying system.

FIG. 6 is a detailed view of the graph of FIG. 5.

DETAILED DESCRIPTION OF THE INVENTION

Figure 3:
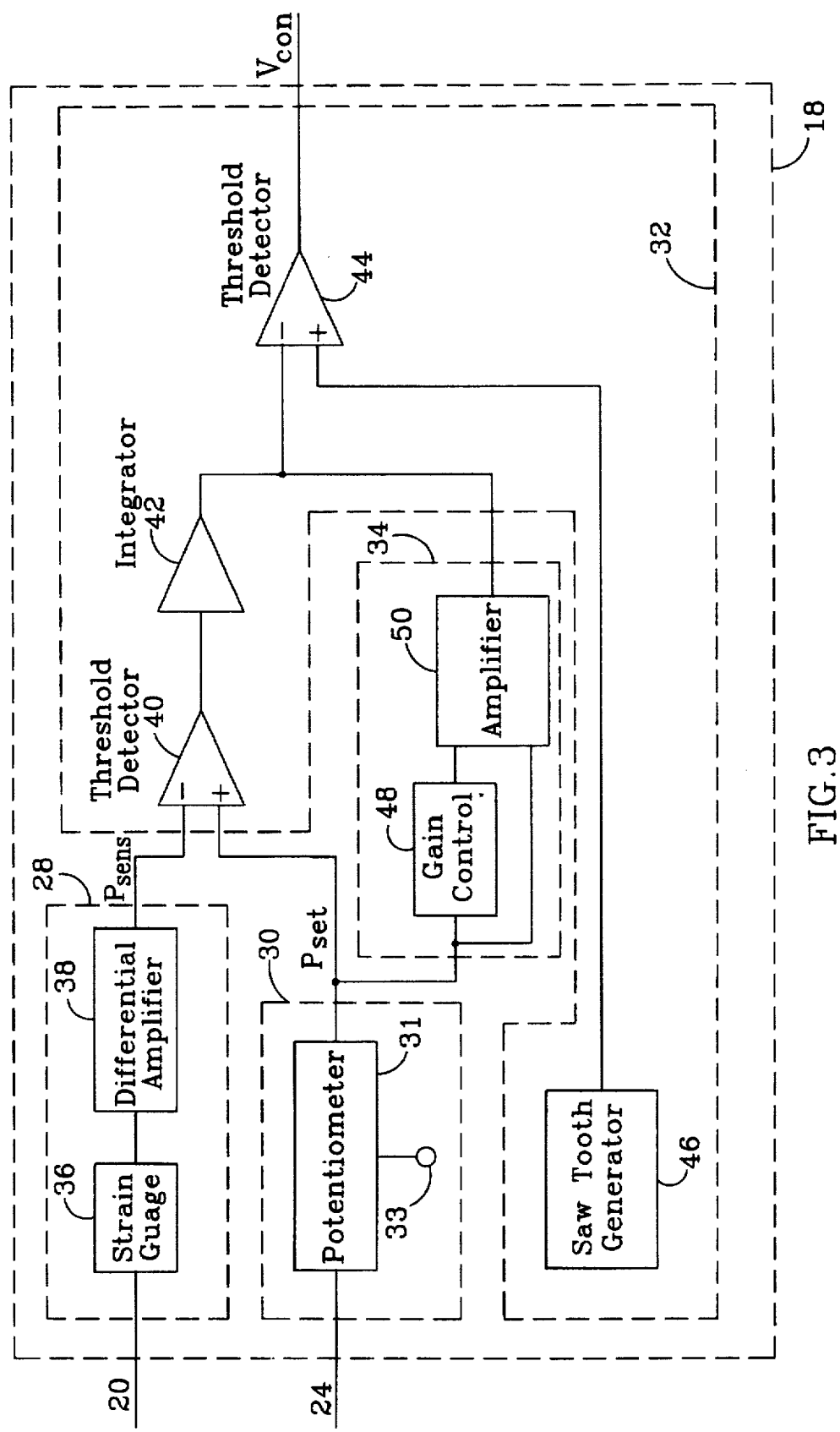
FIG. 3 is a more detailed block diagram of the new controller which includes the constituent parts of the current governor.

The liquid spaying system of FIG. 1 employs a motor current control circuit 10 to drive an electric motor 12 that is mechanically coupled to a pump 14. The pump 14 delivers pressurized liquid to a spray gun 16. All of these components are conventional. A new controller 18 has a pressure sensing input 20 which is connected to receive a mechanical signal from the pump 14. The signal from the pump, which is preferably provided as a fluid under pressure that has been "tapped off" the pump 14 and transmitted through a line 22, is representative of output pressure from the pump 14. The controller 18 also has a pressure setting input 24 which permits an operator, e.g. a painter, to adjust the system's output, or spray, pressure. The input 24 may be a dial setting, a slide switch or similar mechanical interface which the painter physically manipulates to indicate the spray pressure he desires.

The controller 18 provides an output control signal Vcon, at its output 26, which is responsive to the pressure setting 24 and pressure sensing 20 inputs. This signal, Vcon, is sent to the motor current control circuit 10. In a preferred embodiment, the signal Vcon is a pulse train that is employed in a conventional manner by the motor current control circuit 10, using silicon controlled rectifiers, to provide timed motor drive current to the motor 12. In a first order analysis, when the pressure setting signal Pset (appearing at the pressure setting input 24) exceeds the sensed pressure signal Psens (appearing at the pressure sensing input 20), Vcon is a fixed-width pulse train that causes the pump motor to operate at full speed. Operating at full speed, the pump builds pressure until Psens exceeds Pset, at which point Vcon is transformed into a level signal that turns the pump motor off. The forgoing describes that conventional "on-off" pump motor control. However, the new controller 18 incorporates a variable governor, to be described in greater detail in relation to the following figures, that limits the speed at which the pump motor operates, thus limiting pressure overshoot and, ultimately, overspray.

The block diagram of FIG. 2 provides a functional-level view of the inventive controller 18. A representation of the output pressure from the pump 14 is mechanically coupled through the input 20 to a pressure sensor 28, which converts the mechanical signal Psens to an electrical signal having the same label(Psens). Similarly, at the input 24 a mechanical signal Pset such as a dial setting is converted by a pressure setting circuit 30 to an electrical signal having the same label. These electrical signals are fed to a pulse output circuit 32 which provides the signal Vcon at the output 26. Additionally, the electrical Pset signal is routed to a new variable governor 34 which develops a signal from Pset that is used by the pulse output circuit 32 to limit the signal Vcon. As will be described in greater detail in reference to the following figures, the variable governor 34 acts, at low pressure settings, to reduce the width of each pulse of the signal Vcon, thus reducing the current supplied to, and consequently the speed of, the motor 12. This motor speed reduction results in reduced pressure overshoot at lower pressure settings.

The expanded block diagram of FIG. 3 illustrates a preferred embodiment of the new controller 18. The pressure sensor 28 includes a strain gauge bridge 36 connected to a differential amplifier 38. Strain gauge bridges and differential amplifiers are known in the art; for a discussion of them see Paul Horowitz, Winfield Hill, *The Art of Electronics*, Second Edition, Cambridge University Press, New York, 1991 at pages 1001–1002 and 421–425, respectively. As described in greater detail in relation to FIG. 3, the strain gauge 36 accepts a mechanical indication of the output pressure from the pump 14 and converts it to a differential electrical signal. For the sake of convenience, the differential amplifier 38 converts the differential electrical signal from the strain gauge 36 to a single-ended signal.

In the preferred embodiment, the pressure setting circuit 30 consists of a potentiometer 31 connected between positive and negative voltage supplies V⁺and V⁻, which in the preferred embodiment are 5V and −5V, respectively. To select an output pressure, an operator turns the potentiometer's control dial 33 to the desired setting. The potentiometer produces a single-ended voltage output Pset representative of the dial setting. Psens and Pset are fed to the pulse output circuit 32.

The pulse output circuit 32 preferably consists of a threshold detector 40 which receives Psens and Pset at its inverting and noninverting inputs, respectively. The threshold detector 40 provides a positive output to an inverting integrator 42 whenever Pset is greater than Psens. The integrator 42 provides a "soft start" for the pump 14, by gradually changing its output to a low level in response to positive output excursions of the threshold detector 40. By providing a delay in this manner, the integrator 42 reduces the inrush current of the pump motor 12.

The integrator output is connected to the inverting input of a threshold detector 44. The noninverting input of the threshold detector 44 accepts a sawtooth waveform from a sawtooth generator 46. Sawtooth generators are known in the art and will be discussed in greater detail in relation to FIG. 4. Ignoring for the moment the effect of the governor 34, as the output of the integrator 42 drops (in response to Pset being greater than Psens), the value of the sawtooth waveform exceeds that of the integrator output and the threshold detector 44 provides a positive output for so long as a portion of the sawtooth exceeds the integrator output. In this way a pulse train is produced which may be employed, for example, by a conventional SCR motor current control circuit 10 to provide current to the motor 12 whenever the output Vcon is negative. As mentioned above, at the time the motor 12 is initially turned on, the integrator 42 limits the width of these pulses for a short period of time, thereby limiting the inrush current to the motor 12.

In this preferred embodiment, the governor 34 includes a gain control circuit 48, connected to receive Pset from the pressure setting circuit 30. An amplifier 50 also receives Pset, amplifies it and produces an output which, to some extent, overrides the output of the integrator 42. The gain control circuit 48 produces an output which is connected to the amplifier 50 and varies the gain of the amplifier 50. This operation is explained in greater detail in relation to FIG. 4, but, in general terms, the amplifier 50 limits the negative excursion of the integrator 42 as a function of the Pset signal. Consequently, the width of the pulses produced by the threshold detector 44 and thus the current supplied to the motor 12 are limited as a function of Pset.

Figure 4:
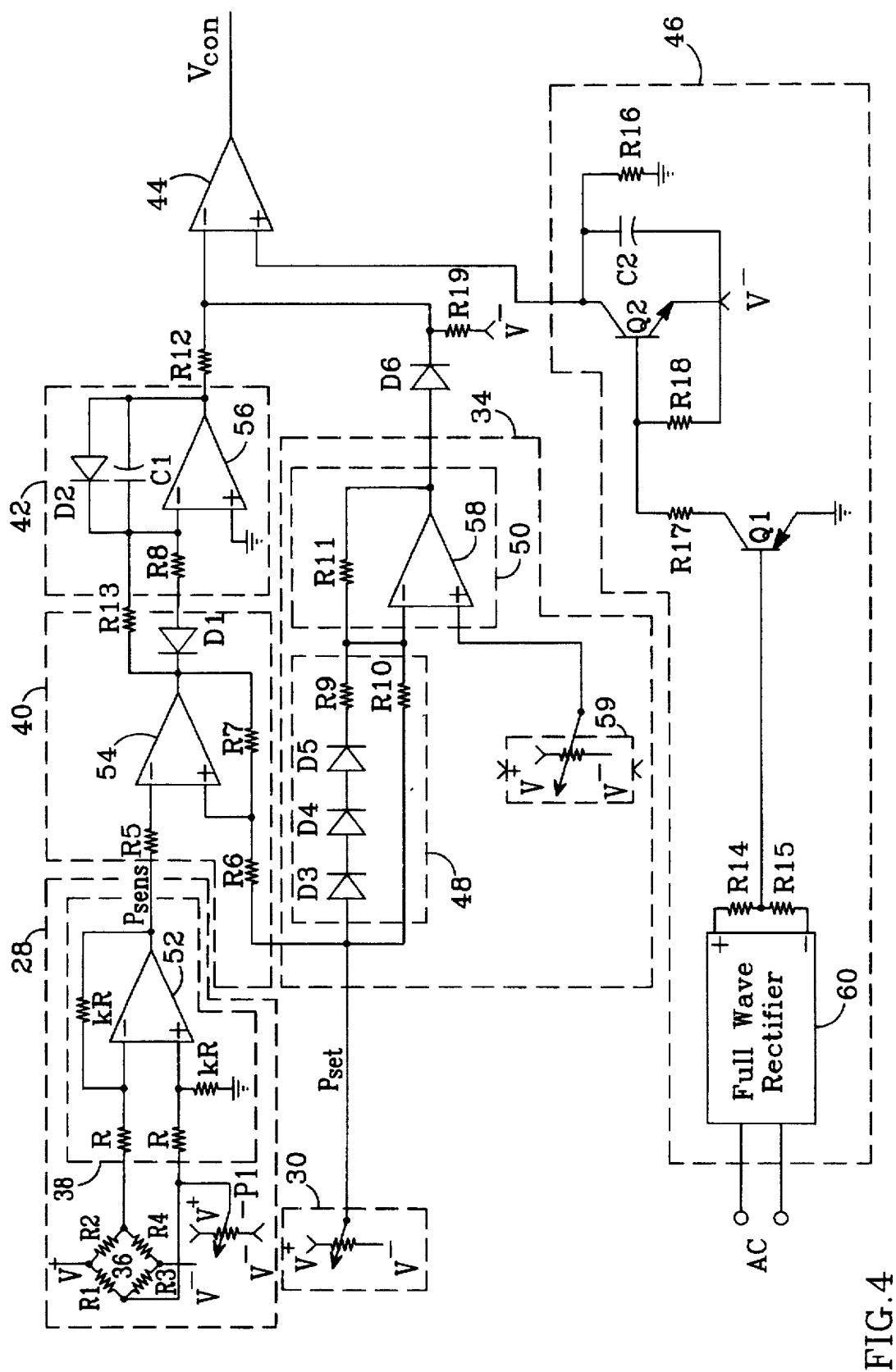
FIG. 4 is a schematic diagram of the new controller which provides details of a preferred embodiment of the controller's circuitry.

Turning now to the schematic diagram of FIG. 4, which illustrates a preferred embodiment of the novel controller 18, the strain gauge 36 consists of four resistors R1–R4 arranged in a bridge with a DC voltage, $V_+$–$V^-$, impressed across two opposing terminals. The output of the bridge is taken from the remaining two terminals of the bridge. The resistors convert strain (elongation and compression due to applied pressure) into changes in resistance. The result of the strain is a small change in differential output voltage at the output terminals of the strain gauge 36.

This differential output voltage from the strain gauge is applied to the differential amplifier 38, which converts the differential signal into a single-ended signal. The gain of the amplifier, with input resistors and feedback resistors having respective resistance values R and kR as illustrated, is k and the output is kVdiff, where Vdiff is the value of the differential input from the strain gauge 36. A potentiometer P1 provides a mechanism for adjusting the spray system's maximum output pressure. In the preferred embodiment P1 is set in the factory by turning the pressure setting potentiometer 30 to its maximum pressure setting, and then P1 is adjusted until the desired maximum pressure is obtained at the output of the pump 14.

Psens and Pset are fed through resistors R5 and R6, respectively, to the threshold detector 54. In the preferred embodiment, the threshold detector 54 and differential amplifier 52 are provided with +5V and −5V at their positive and negative supply terminals, respectively. Whenever Psens is greater than Pset, the output of threshold detector 54 is approximately −5V. When Psens falls below Pset, the output of threshold detector 54 rises to +5V. A feedback resistor R7 provide approximately 0.075V of hysteresis for the threshold detector 54, so that the controller 18 doesn't continuously cycle the motor on and off as the system's output pressure hovers around its target setting.

The output of the threshold detector 54 is fed through a blocking diode D1 in parallel with a resistor R13 to the integrator 42. The integrator is composed of an amplifier 56 with an input resistor R8 connected from the anode of diode D1 to its inverting input, and a diode D2 and capacitor C1 connected in parallel in the feedback path between the output and inverting input of the amplifier 56. As noted above, when Psens exceeds Pset the output of the amplifier 54 is approximately −5V. In this case the diode D2 clamps the output of the amplifier 56 at approximately 0.7V. When Psens falls below Pset, the output of the amplifier 54 is approximately 5V and the output of the amplifier 56 gradually charges to −5V through the R13/C1 combination. In practice, R8 is chosen to have a substantially lower resistance than R13. In this way, although C1 charges relatively slowly through R13, it discharges rapidly through resistor R8. As a result, the motor 12 is turned on slowly but turns off rapidly, thereby reducing inrush current to the motor 12 on one hand and reducing pressure overshoot on the other.

As noted in the discussion related to FIG. 3, the new controller 18 includes a variable governor 34 which, in turn, comprises a gain control circuit 48 and an amplifier 50. In the preferred embodiment, the gain control circuit consists of diodes D3, D4 and D5 connected in series with a resistor R9, with the D3–D5/R9 circuit connected in parallel with a resistor R10 between the pressure setting potentiometer 30 output and the inverting input of another operational amplifier 58. The gain of the amplifier circuit 50 is determined by the gain control circuit 48 in combination with a feedback resistor R11 as follows. At low pressure settings, the value of Pset is insufficient to forward bias the diodes D3–D5; therefore the gain of the amplifier is simply −R11/R10. At higher pressure settings, Pset reaches a point at which it forward biases the diodes D3–D5 and the gain is then approximately −R11/(R10‖R9), where R10‖R9 is the parallel combination of resistors R10 and R9. The output of the amplifier 58 is a motor speed limiting voltage that is preferably proportional to the desired pressure setting Pset. Moreover, the proportionality varies with the pressure setting, being greater at higher pressure settings than at lower settings. This permits greater overshoot at higher pressures (where the effects are inconsequential) and limits overshoot at lower pressure settings. An offset adjustment 59, having its output connected to the noninverting input of the amplifier 58, is employed during calibration to shift the amplifier output to accommodate different motor and pump combinations.

The outputs of amplifiers 50 and 42 are connected, respectively, through a clamping diode D6 and a resistor R12 to the inverting input of a threshold detector 44. The value of the resistor R12 is relatively large, and the integrator 42 cannot pull the inverting input of threshold detector 44 more than one diode drop below the output of the amplifier 58. In this manner the amplifier 58 limits, as a function of the desired pressure setting signal Pset, how negative the integrator 42 may drive the inverting input of the threshold detector 44. Since the threshold detector output Vcon is positive only when the signal at its noninverting input exceeds that at its inverting input, limiting the negative excursion at the inverting input limits the time the output from the sawtooth circuit 46 exceeds the signal at the inverting input. As a result, the pulse widths of the threshold detector output Vcon are narrower than they would otherwise be.

In the preferred embodiment, the conventional sawtooth waveform generator 46 includes a full wave rectifier 60 which rectifies an AC signal supplied across its inputs. The AC signal is derived from the same prime AC power input used to drive the motor 12. Thus, the sawtooth is synchronized with the prime AC power. The rectified signal drives the base of a pnp transistor Q1 which, in turn, drives the base of a npn transistor Q2. Resistors R14 and R15 are connected in series between the positive and negative outputs of the full wave rectifier 60. The ratio of their resistances is such that the voltage applied to the base of transistor Q1 will briefly drop below 0 V as the prime AC power voltage passes through 0V. This negative voltage will briefly turn on transistor Q1 which will, in turn, provide current through R17 to turn on transistor Q2. Resistor R18 will hold transistor Q2 "off" until transistor Q1 turns "on".

When transistor Q2 turns on it discharges a capacitor C2 that is connected across its emitter and collector. The emitter of transistor Q2 is connected to the negative supply voltage V⁻(−5V in the preferred embodiment) and the capacitor C2 is discharged to this level. When the transistor Q2 turns off, the capacitor C2 recharges, through resistor R15, to 0V. The collector of the transistor Q2 is connected to the noninverting input of the threshold detector 44. In this manner a sawtooth waveform (approximately) varying from 0V to −5V is delivered to the threshold detector 44 which, as previously described, compares the sawtooth signal to a level signal at its inverting input. The output of the threshold detector 44 varies from a steady −5V (whenever the inverting input is greater than the noninverting input) to a +5V pulse train, with the width of the pulses limited by the new governor 34.

Operation of the preferred embodiment is graphically illustrated in FIG. 5, in which Pset is plotted versus Psens. Recall that the values of Pset and Psens are related to the desired and actual output pressure levels, respectively. The energize line 62 is the locus of points where Psens=Pset. To the left of the line 62, Pset>Psens and the control loop is turned "on", i.e., the motor current control circuit 10 is providing current to the electric motor 12. In the control loop "off" state no current is supplied to the motor 12.

A hysteresis line 64 is approximately parallel to the energize line 62. Typically the hysteresis line 64 is translated approximately 50 to 75 psi to the right of the energize line 62. The control loop will always be "off" in the region to the right of the hysteresis line 64.

A third line, operating line 66 is constructed by forcing the control loop into the "on" state and then plotting Pset versus Psens for a fixed load. For example, assume it is desired to plot the operating line for a 0.01 inch diameter spray tip aperture using water as the liquid to be sprayed. Pset is adjusted to a low value, preferably near zero, then the trigger of the spray gun 16 is depressed until the pressure represented by Psens stabilizes. The corresponding values of Psens and Pset are then plotted. The values of Pset and Psens are incremented in this manner until line 66 is obtained.

FIG. 6 is an enlarged view of the circled area 65 of FIG. 5. This enlarged view provides a detailed view of the area where the three lines cross. Three operating regions I, II and III are illustrated within this area. Operation in region I will result in steady output pressure, with Psens less than Pset. Operation in region II will result in steady output pressure, with Psens slightly greater than Pset. Operation in region III will result in pulsating output pressure as the control loop repeatedly cycles the electric motor 12 on and off. The operating line 66 may not cross either of the other two lines in certain implementations, e.g., when operation is confined to only one or two operating regions. Note that, for a given operating line 66, the operating regions can be identified in terms of ranges of Pset values.

To illustrate operation in region I, assume the output pressure (as manifested by Psens) is equal to a pressure X1 that falls to the right of hysteresis line 64, and the desired pressure setting (Pset) equals Y1. The control loop will initially be "off". When the trigger of spray gun 16 is depressed, the output pressure will drop, moving horizontally to the left until it falls to pressure X2. At this point, the control loop will turn "on". Even though the motor 12 is energized at this point and is driving the pump 14, the output pressure will continue to drop until it reaches X3, where it will remain until the trigger is released. When the trigger is released, output pressure will build, retracing its previous track until output pressure reaches X4, at which time the control loop will turn "off". Output pressure will remain at X4 until such time as the spray gun 16 is again triggered.

To illustrate operation in region II, again assume that the output pressure (Psens) is at X1 and the desired pressure setting(Pset) is increased to Y2. The control loop initially will be "off". When the trigger is depressed, the output pressure will drop, moving horizontally to the left until it falls to pressure X5, at which time the control loop will turn "on". Output pressure will then build, retracing its previous track until it reaches X6, where it will remain until the trigger is released. When the trigger is released, output pressure will build until it reaches X7, at which time the control loop will turn "off". Output pressure will remain at X7 until such time as the spray gun 16 is again triggered.

To illustrate operation in the region III, again assume the output pressure (Psens) is at X1 and the desired pressure (Pset) is increased to Y3. The control loop initially will be "off". When the trigger is depressed, the output pressure will drop, moving horizontally to the left until it falls to pressure X8, at which point the control loop will turn "on". Output pressure will then build, retracing its previous track until it reaches X9, at which time the control loop will turn "off". Output pressure will again fall to X8 and rise again to X9. This cycle will continue until the trigger is released, at which time the output pressure will build to X9 and the control loop will turn "off".

The forgoing description of a specific embodiment of the invention has been presented for the purposes of illustration and description. It is not intended to be exhaustive or to limit the invention to the precise form disclosed, and many modifications and variations are possible in light of the above teachings. For example, the governor may provide more than the two gains described in the preferred embodiment. It is intended that the scope of the invention be limited only by the claims appended hereto.

We claim:

1. A variable governor for a liquid pump motor controller, comprising:

a pressure selection input port for accepting a pressure setting signal which reflects a desired pressure setting, a variable gain amplifier connected to receive said signal and to produce an amplified output signal in response to said pressure setting signal, a gain control circuit which causes the gain of said amplifier to be greater for pressure settings above a predetermined threshold level than for pressure settings below said threshold level, and an output port that is connectable to provide an output signal from said variable gain amplifier to a liquid pump motor to control the speed of the motor.

2. The variable governor of claim 1, wherein the amplifier has a variable offset input for calibrating the value of the amplifier's output signal.

3. A motor controller for a liquid pump motor, comprising:

an input for receiving a pressure sensor signal which reflects an associated pump's output pressure, an input for receiving a pressure setting signal, a motor speed control circuit which provides a motor speed control signal in response to the pressure sensor and pressure setting signals, and a variable governor which controls said motor speed control signal in response to the pressure setting signal so that the ratio of the pressure established by the pump to the value of the pressure setting signal is less for pressure settings below a threshold level than it is for pressure settings above said threshold level.

4. The motor controller of claim 3, wherein the governor comprises a variable gain amplifier connected to amplify said pressure setting signal, the gain of said amplifier being a function of said pressure setting signal.

5. The motor controller of claim 4, wherein said motor speed control circuit comprises a pulse-train generator and a threshold detector connected to provide a variable width motor speed control pulse-train, the pulse width of which is limited by said governor.

6. A motor controller for a liquid pump motor, comprising:
 a motor speed control circuit connected to provide a motor speed control signal in response to a) a pressure sensor signal which indicates the liquid pressure produced by an associated pump and b) a pressure setting signal which indicates a desired pressure setting for the pump, and
 a control element that modifies the motor speed control signal to reduce the pressure produced by the pump, relative to the pressure that would be produced in the absence of said control element, for pressure setting signals below a threshold level, and to increase the pressure produced by the pump, relative to the pressure that would be produced in the absence of said control element, for pressure settings greater than said threshold level.

7. The motor controller of claim 6, wherein said control element progressively increases the maximum differential between the pump pressure and the pressure that would be produced in the absence of said control element, for pressure settings above said threshold level up to a hysteresis level, and thereafter maintains said maximum differential substantially constant.

8. A liquid spraying system, comprising:
 a pump for pumping liquids,
 an electric motor mechanically linked to drive said pump,
 a motor current control circuit having an output connected to provide a controlling current to said motor, and a control input, said circuit varying said controlling current as a function of a signal at said input,
 a motor controller having a pressure sensor input, a pressure setting input, and a motor speed control output, said pressure sensor input connected to receive an indication of the pressure produced by said pump, said pressure setting input connected to provide a desired pressure setting, and said motor speed control output connected to provide a control signal to said motor current control circuit input, said controller further comprising a variable governor connected to limit said controlling current as a function of said pressure setting so that the ratio of the pressure established by the pump to the value of the pressure setting signal is less for pressure settings below a threshold level than it is for pressure settings above said threshold level, and
 a spray gun connected to receive liquid from the pump and to spray the liquid.

9. The liquid spraying system of claim 8, wherein said pressure setting signal has a range corresponding to a range of desired output pressures and said variable governor comprises a variable gain amplifier connected to amplify said pressure setting signal, the gain of said amplifier increasing at least once as said pressure setting signal varies from the low end to the high end its range.

10. The liquid spraying system of claim 9, wherein the gain of said amplifier is a nonlinear function of said pressure setting signal.

11. A liquid spraying system controller, comprising:
 pressure setting and pressure sensing inputs for receiving pressure setting and pressure sensing signals indicative of desired and measured system output pressures, respectively,
 a pulse output circuit connected to receive said pressure sensing and pressure setting signals and to provide an output pulse train whenever said signals indicate that the measured pressure is less than the desired pressure, and
 a variable governor connected to receive said pressure setting signal and to limit the width of the pulse train pulses as a function of said pressure setting signal, with greater widths for pressure settings above a threshold level and lesser widths for pressure settings below said threshold level.

12. The controller of claim 11, wherein said variable governor comprises a variable gain amplifier connected to amplify said pressure setting signal.

13. The controller of claim 12, wherein said pressure setting signal has a range corresponding to a range of desired output pressures and the gain of said amplifier increases at least once as said pressure setting signal varies from the low end to the high end of its range.

14. The controller of claim 13, wherein said pulse output circuit includes a sawtooth generator and a comparator, said sawtooth generator and variable governor connected to a threshold detector output of the sawtooth exceeds that of the variable governor.

15. A method of operating a liquid pump motor in response to a user-controlled pressure setting signal, the pump being capable of pumping liquids within lower, intermediate and higher pressure ranges, comprising:
 causing the motor to increase the pump pressure, in response to rises in the pressure setting signal, at a rate of increase that is within a first range for lower pressure settings,
 causing the motor to increase the pump pressure, in response to rises in the pressure setting signal, at a rate of increase that is within a second range greater than said first range for intermidiate pressure settings, and
 causing the motor to increase the pump pressure, in response to rises in the pressure setting signal, at a rate of increase that is within a third range less than said second range for higher pressure settings.

\* \* \* \* \*